March 16, 1937. P. J. PALMER 2,073,878
MOTOR VEHICLE
Filed April 28, 1934
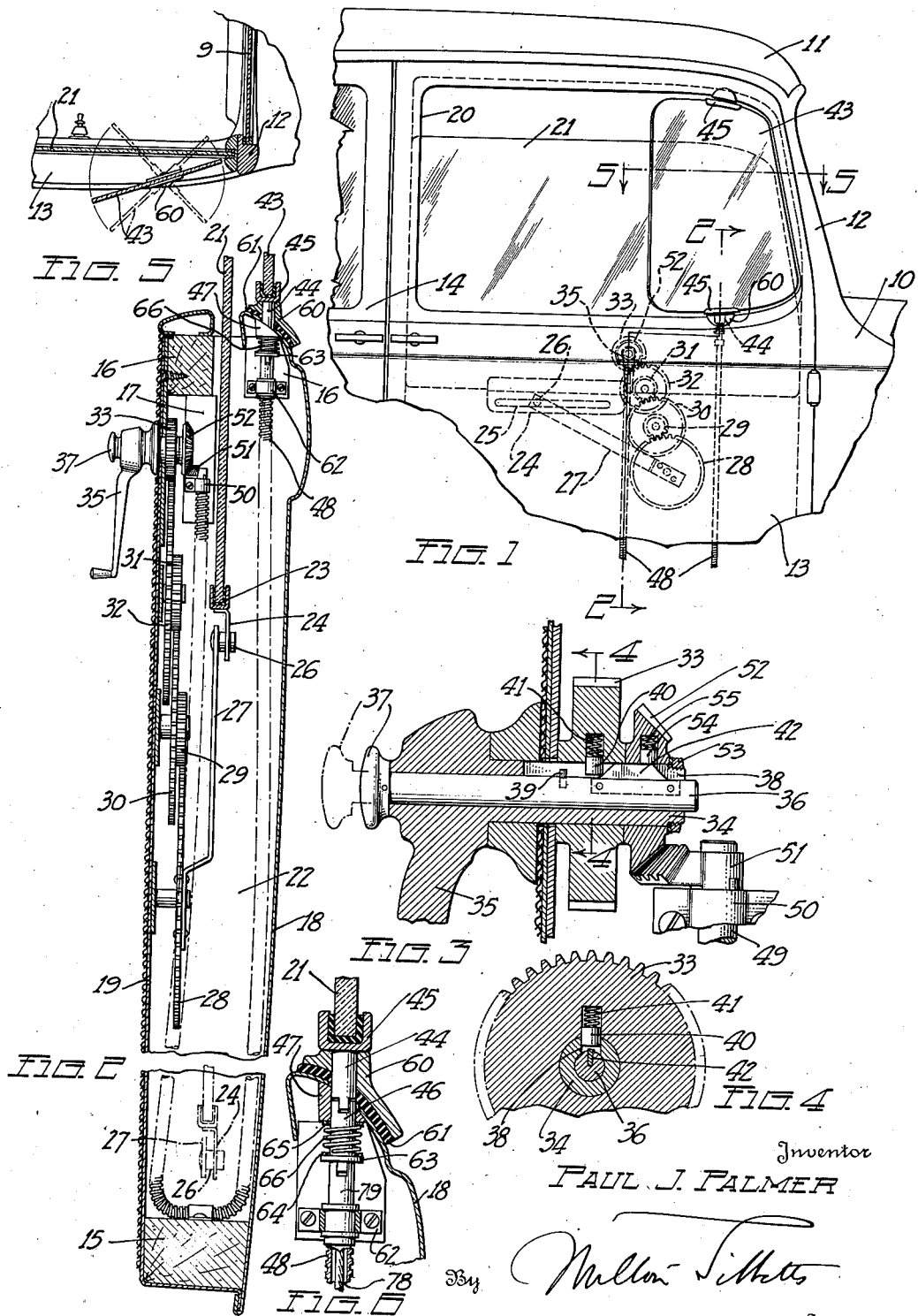
Inventor
PAUL J. PALMER
By Milton Tibbetts
Attorney Patented Mar. 16, 1937

2,073,878

UNITED STATES PATENT OFFICE 2,073,878

MOTOR VEHICLE

Paul J. Palmer, Grosse Pointe, Mich., assignor to Packard Motor Car Company, Detroit, Mich., a corporation of Michigan Application April 28, 1934, Serial No. 722,828

8 Claims. (Cl. 296—44)

This invention relates to motor vehicles and more particularly to body ventilation.

It is well known in the motor vehicle art to provide bodies with slidably adjustable windows having deflector wings adjacent the window openings in order to provide ventilation. With such systems, the window is adjusted through mechanism operated by a hand crank while the deflector wing must be positively set in desired angular position. In regulation such ventilating system to meet varying conditions, it is relatively easy to change the window position but the vehicle must be stopped and considerable manipulation is required in order to vary the angular position of the wing deflector.

It is an object of my invention to provide a ventilating system for vehicle bodies which consists of a movable window and a deflector wing which can be readily regulated from the interior of the body while the vehicle is moving.

Another object of the invention is to provide a single actuator for selectively operating a window adjusting mechanism or a deflector wing adjusting mechanism.

A further object of the invention is to provide a vehicle wing deflector with adjusting mechanism which can be actuated from within the vehicle body.

Other objects of the invention will appear from the following description taken in connection with the drawing, which forms a part of this specification, and in which:

Fig. 1 is a side elevational view of a front portion of a motor vehicle body having my invention incorporated therewith;

Fig. 2 is a sectional view taken on line 2—2 of Fig. 1;

Fig. 3 is a fragmentary sectional view taken on line 2—2 of Fig. 1 illustrating the actuator means;

Fig. 4 is a sectional view taken on line 4—4 of Fig. 3;

Fig. 5 is a sectional view taken on line 5—5 of Fig. 1 illustrating some of the angular positions in which the wing deflector can be adjusted with reference to the adjacent window.

Referring now to the drawing by characters of reference, 10 represents one side of a motor vehicle body, 11 the top of the body and 12 a side post of the windshield 9. Hinged to the body are the usual door structures 13 and 14 which serve to close openings through which passengers can enter or leave.

The front door structure 13 comprises the usual frame structure, as indicated at 15, 16, and 17, an outer panel 18 and an inner panel 19. The upper portions of the panels are formed to provide an opening 20 in which the glass window 21 is vertically adjustable, there being the usual front and rear runways provided interiorly of the outer panel adjacent the opening. The intermediate frame member 16 is slotted in order that the window may be adjusted vertically therethrough to provide ventilation for the interior of the vehicle body. In Fig. 2, the window is shown in full lines in its uppermost position closing the opening while the lowermost position of the bottom of the window is shown in dotted lines adjacent the bottom of the door, the window sliding in the door compartment 22 formed between the panels 18 and 19.

To the bottom edge of the glass window is fixed a bracket member 23 from which depends a regulating bar 24, such bar having a longitudinally extending slot 25 therein to receive a pin 26 carried by a regulator arm 27. This arm is fixed to rotate with a gear 28 which is driven by a train of gears 29, 30, 31, 32, and 33. Such gears are suitably mounted on journals carried by the inner panel of the door. The journal 34 for the gear 33 extends interiorly of the body and a crank 35 is formed integrally with the inner end thereof to form an actuator for the mechanism which raises and lowers the window.

Extending through the journal and the crank is a shaft 36 having a knob 37 fixed on the inner end thereof by means of which it can be moved axially. A portion of the journal or shaft 34 is formed with an axially extending peripheral slot 38 and extending into such slot is a pin 39 which is fixed to the shaft 36, such pin being arranged to limit the inward axial movement of the shaft 36 by means of contact with the wall forming the inner end of the slot. A clutch member 40 is mounted to slide radially in the hub of the gear 33 and is normally pressed into the slot 38 by a coil spring 41 under which circumstances the gear 33 will be locked to rotate with the shaft or journal 34. Fixed to the shaft 36 and extending into the slot 38 is a clutch control member 42 having cam surfaces at its end for disengaging the clutch element 40 when the shaft 36 is moved inwardly of the body.

When the clutch element 40 is within the slot 38, rotation of the crank 35 will be transmitted by the clutch to the gear 33 and the gear train so that the arm 27 will be swung up or down, depending upon the direction of crank rotation, and thus raise or lower the window through the connection of the pin 26 in the slot 25 of the window bar 24.

In order to deflect air when the window is in any open position, I provide deflector means which can be adjusted angularly about a vertical pivot. In the present instance, such deflector means consists of a glass wing 43 which is pivoted to the door by means of upper and lower concealed trunnions 44 formed integral with brackets 45 fixed to the upper and lower edges thereof. The wing deflector is of substantially the same shape as the forward end of the window opening and is pivoted exteriorly of the window sufficiently to permit some angular adjustment thereof when the window is in less than fully open position.

Beneath the bracket 45 is a bearing member 60 which rests on a rubber pad 61 engaging the surface of the panel 18 bent to form the molding around the window opening. The rubber is preferably vulcanized to the panel and the bearing member to secure them in position and the trunnion 44 extends through the bearing member, the pad and the molding. The inner end of the trunnion projects into a bearing 47 fixed to the door structure and is engaged by a driving coupling 46 which also engages a shaft 79 to which is fixed an end of the flexible driving shaft 78 carried in the casing 48. The shaft 79 is held in position by a bracket 62 and the lower end portion of the coupling has a flange 63 with a friction ring 64 bearing thereon. Another friction ring 65 engages the underside of the bearing 47 and between such friction rings is a coil spring 66. This arrangement of spring and friction rings resists any tendency of wind forces to rotate the deflector wing and thus maintains the wing in adjusted position. The flexible shaft and casing extend downwardly beneath the lowermost position of the window in compartment 22 and then upwardly where the flexible shaft is fixed to a shaft 49 positioned by a bracket 50. On the shaft 49 is fixed a gear segment 51 which is arranged to mesh with a gear 52 mounted on the shaft or journal 34 adjacent the gear 33. Suitable securing means 53 engages the shaft 34 to retain the gears in fixed position axially.

A clutch member 54 is slidable in a recess in the gear 52 and is normally pressed into the groove 38 by means of a spring 55. The clutch control member 42 controls this clutch member 54 in the same manner that it controls the clutch member in the gear 33. Thus when the control member 42 is moved to the right, as viewed in Fig. 3, the clutch member 54 will be moved out of the recess 38 so that rotation of the shaft 34 will not rotate the gear 52 because the driving connection has been broken and, in such position, the clutch 40 will be in driving relation with the shaft 34. When the shaft 36 is moved to the position shown in dotted lines in Fig. 3, then the clutch member 40 is pressed out of driving relation and the gear 52 is free to enter the slot 38 and establish a driving relation between the shaft 34 and the gear 52. Rotation of the crank when the gear 52 is in driving relation with the shaft 34 will rotate the gear segment 51, the flexible shaft 78 and the lower pinion 44 of the wing deflector so that the angular position thereof with reference to the body is regulated as desired.

The actuator 35 is, by means of the clutch control, selectively placed in driving relation with either the mechanism for raising and lowering the window or with the mechanism for changing the angular position of the wing deflector. When the window is entirely down, the wing deflector can be moved at an angle so that it traverses the window and thus flow of air inwardly of the body as directed by the deflector can be had, such adjustment being of course preferable for ventilating the body when the temperature is relatively high. The wing deflector also can be adjusted to a limited extent when the window is in partly open position in order to deflect the air away from the opening and thereby draw air from the body. The adjustment of both the wing deflector and the window can be readily obtained by the operation of the crank 35 from within the body and thus the driver of the vehicle can obtain such adjustments without stopping or slowing down.

Although the invention has been described in connection with a specific embodiment, the principles involved are susceptible of numerous other applications which will readily occur to persons skilled in the art. The invention is therefore to be limited only as indicated by the scope of the appended claims.

What I claim is:

1. In a vehicle, the combination of a body having a hollow side wall with an opening therethrough, a window structure extending the entire length of the body opening and associated with the body to slide vertically, a wing deflector pivoted to the body exteriorly of and adjacent the forward portion of the window, mechanism operable to raise and lower the window structure, mechanism operable to pivot said deflector, said mechanisms being located within the hollow wall of the body and having portions thereof extending interiorly of the vertical plane in which the window structure is movable, and means extending into the hollow wall from the interior of the body and operable to selectively actuate either mechanism, said means being engageable with the portions of the mechanisms in the hollow wall inside of the vertical plane in which the window structure is movable.

2. Ventilating means for vehicle bodies having a door with a sliding window comprising a wing deflector pivoted exteriorly of the window, deflector rotating mechanism including a flexible cable looped under the window in the door, and actuator means within the body engageable with the deflector rotating mechanism.

3. In a vehicle having a door with a vertically slidable window therein, a wing deflector pivoted to the door exteriorly of the window, deflector adjusting mechanism in the door, said mechanism including a flexible cable looped under the window, and actuator means extending through the interior of the door and engageable in driving relation with said mechanism.

4. In a vehicle, a door having an opening therein, a window slidable to open and close the opening in the door, a deflector pivotally mounted on the door at the forward end of the opening and in spaced relation exteriorly of the slidable window, mechanism for raising and lowering the window, mechanism for pivotally adjusting the deflector, and actuator means for selectively operating either of said mechanisms.

5. In a vehicle having a door with a window opening therein, a window slidable in the door to regulate the size of the opening, a deflector pivoted to the door at the forward end of the opening and exteriorly of the window, mechanism contained within the door for sliding the window, mechanism contained within the door and engaged therein with the deflector pivot to rotate the same, and actuator means extending into the door for selectively engaging and operating either one of said mechanisms.

6. In a vehicle, ventilating means comprising a body structure having an opening therethrough, a window carried by said body structure and vertically slidable to open or close said opening, a deflector pivotally mounted on said body structure exteriorly of said window and adjacent thereto, regulating mechanism extending under said window in said body structure and connected to rotate said deflector when actuated, and means within said body operable to actuate said regulating mechanism.

7. In a vehicle, ventilating means comprising a body structure having an opening through a side wall thereof, a vertically slidable window in the body structure for regulating the size of or closing said opening, a deflector pivoted to the body within said opening on a substantially vertical axis, mechanism concealed in said frame structure for pivotally adjusting said deflector, said mechanism extending under the window in its lowered position, and an actuator for said mechanism operable from within said body.

8. In a vehicle, ventilating means comprising a body structure having an opening through a side wall, a window slidable in said body structure and said opening, mechanism contained within said body structure operable to slide said window, a deflector co-extensive with the forward end of said window opening and pivoted to the body within said opening, said deflector being swingable exteriorly of said window to parallel the same or to extend partly exteriorly of said body structure extending under said slidable window, mechanism within said body structure for pivoting said deflector, and means operable by a passenger within said body structure for selectively actuating said mechanisms.

PAUL J. PALMER.